United States Patent Office 3,704,230
Patented Nov. 28, 1972

3,704,230
EXOTHERMIC COMPOSITIONS
Domingos Loricchio, Sao Paulo, Brazil, assignor to The
Carborundum Company, Niagara Falls, N.Y.
No Drawing. Filed Jan. 22, 1971, Ser. No. 108,999
Claims priority, application Brazil, Feb. 17, 1970,
216,800
Int. Cl. B22d 7/10; C21c 7/06
U.S. Cl. 252—182
11 Claims

ABSTRACT OF THE DISCLOSURE

An exothermic composition, useful for example, in casting cast iron (to keep the iron molten in the header of the mold while the iron within the mold solidifies and contracts, therefore requiring additional molten iron to fill up the mold) comprises silicon carbide; a silicon carbide decomposition catalyst (e.g., lead dioxide, potassium dichromate, or lead chromate); and optionally, such additional ingredients as a combustible organic filler, a silicon carbide decomposition retardant (such as alumina or silica), calcium chloride, and ferrosilicon.

BACKGROUND OF THE INVENTION

This invention relates to exothermic powders or pulverulent compositions for use in metallurgical processes. By the expression "exothermic powders" is meant materials or compositions in the form of powders, i.e., finely granulated ingredients with average particle diameters of less than about 150 microns and higher than about 30 microns—employed in metallurgy of cast irons and steels—with the purpose of generating calories, increasing in loco the temperature of the metal or of the metal alloy, maintaining the same in liquid condition and making thus possible the exit of air bubbles and gases generated by chemical reactions not entirely complete and further carrying out other metallurgical modifications, particularly in the treatment of cast irons and steels.

These powders can be added by scattering them onto the liquid metal at the free and open surface of the casting molds for cast irons, cast steels, deadhead type ingots; or applying them to casting sands or molding compositions, always with the specific purpose of generating calories, liquefying the metal, facilitating the exit of gases and releasing with greater facility the cast iron or steel pieces from the molds.

Another purpose of these powders is concerned with the cleaning or decrustation of casting iron and steel gates by the fusion of slags that little by little adhere to the surface of the refractories and obstruct the passage of the liquid metal.

Finally, the fluidification and the deflocculation of the furnace slags is another purpose of the exothermic powders. The coarse and highly viscous slags, which are difficult to separate from the metal and/or its alloys, are fluidified whereby they are more easy to be removed by means of the exothermic powders.

SUMMARY OF THE INVENTION

These purposes can be accomplished with an exothermic composition, comprising: (a) from about 18 to about 90% of particulate silicon carbide; and (b) from about 0.05 to about 15% of a particulate silicon carbide decomposition catalyst selected from the group consisting of lead dioxide, potassium dichromate, lead chromate, and mixtures thereof.

DETAILED DESCRIPTION

The exothermic composition of this invention usually comprises, in addition to the silicon carbide and a decomposition catalyst, a substantial portion (up to about 80 or 82%) of a combustible organic filler, e.g., sawdust, plastics, paper, cereal husks, or other organic powders generally, or mixtures thereof. There can also be included silicon carbide decomposition retardants, such as silica, alumina, or mixtures thereof, preferably in an amount ranging from about 3 to about 15%. Other optional ingredients include calcium chloride and ferrosilicon.

Conventional exothermic agents (for example, aluminum) are usually substances that need to be melted, in order, by their subsequent combustion, to generate calories. The use of exothermic powders containing silicon carbide is based on the principle that this crystalline substance neither melts nor forms a gas when it decomposes. The decomposition in itself of silicon carbide is only verified at high temperatures (2000° C., 2400° C. as per Otto Ruff) because the change in entropy in this case is very small. It is known that certain chemical compounds (as carbides and silicides) as they decompose do not form a gaseous phase and are generally stable at high temperatures. Silicon carbide decomposes at temperatures above 2000° C., without a catalyst.

The decomposition of the silicon carbide crystal SiC, in view of the positive catalytic action of iron ions, upon addition of SiC to the metal (cast iron for example), occurs at very much lower temperatures, 1600, 1550° C. and still lower when in the presence of lead, potassium and chromium ions (1350° C.). From this decomposition there is obtained carbon and silicon, in elemental form and of instantaneous reactivity. The exothermic ingredient (silicon carbide) generates a twofold fuel in atomic, elemental condition of greater energetic action, which is all the more energetic, the more the decomposition thereof is catalyzed.

It is still further observed that the silicon carbide crystals, as said above, do not take away calories from the liquid metal, in order, as occurs for instance with ferrosilicon, to melt and then enter into combustion, thus generating calories which compensate for the initial loss. The catalyzed silicon carbide, which constitutes the essential ingredient of the composition of this invention decomposes instantaneously, generates calories by the decomposition itself and still more by the violent combustion of the elemental carbon and silicon then present.

The other ingredients are combustible organic fillers (sawdust, plastics, paper, cereal husks and organic powders generally) and/or modifying additives.

The silicon carbide decomposition retardants are, in general, fine silica and/or fine alumina which are added in adequate dosages as needed by the specific case.

Silicon carbide decomposition catalysts useful in the present invention are, specifically, lead dioxide ($PbO_2$) in amounts from about 0.1 to about 5.5%; potassium dichromate ($K_2Cr_2O_7$) in amounts from about 0.05% to about 4.5% and lead chromate ($PbCrO_4$), in amounts from about 0.5 to about 5.0%.

The content of silicon carbide in the final product may, in turn, range from about 18% to about 90%, in compliance with the desired rate of the exothermic reaction and the lasting time of the exothermic powder when in contact with the liquid metal. In general, greater percentages of silicon carbide with a high content of decomposition catalysts offer a violent and rapid reaction. On the other hand, with lower percentages less violent and more prolonged reactions are obtained. A compromise can be established in that one can start with a highly reactive composition and retard the decomposition with additions of silica or alumina; or modify it with other additives suitable for a specific purpose; or further extend it with combustible organic fillers.

The following specific examples have been formulated:

EXAMPLE 1

| | Percent |
|---|---|
| Silicon carbide | 18.00 |
| Lead dioxide | 0.55 |
| Potassium dichromate | 0.30 |

Filler (sawdust) to make up 100.00.

EXAMPLE 2

| | Percent |
|---|---|
| Silicon carbide | 28.00 |
| Lead dioxide | 1.00 |
| Potassium dichromate | 0.85 |

Filler (rice husks and sawdust) to make up 100.00.

EXAMPLE 3

| | Percent |
|---|---|
| Silicon carbide | 32.00 |
| Ferrosilicon (15% Si) | 10.00 |
| Lead dioxide | 2.00 |
| Potassium dichromate | 1.00 |

Filler (rice husks and sawdust) to make up 100.00.

EXAMPLE 4

| | Percent |
|---|---|
| Silicon carbide | 44.00 |
| Lead dioxide | 2.00 |
| Potassium dichromate | 1.00 |

Filler (recovered plastic powders and the like) to make up 100.00.

EXAMPLE 5

| | Percent |
|---|---|
| Silicon carbide | 55.00 |
| Lead chromate | 3.00 |
| Potassium dichromate | 1.00 |

Filler (powders obtained from washing electrostatic precipitators) to make up 100.00.

EXAMPLE 6

| | Percent |
|---|---|
| Silicon carbide | 55.00 |
| Lead chromate | 3.00 |
| Potassium dichromate | 1.00 |

Filler (rice husks and/or sawdust) to make up 100.00.

Note: In Examples 5 and 6 use was made of retardants constituted of fine silica and fine alumina with 10% and 15% in two experiments.

EXAMPLE 7

| | Percent |
|---|---|
| Silicon carbide | 70.00 |
| Lead dioxide | 2.00 |
| Potassium dichromate | 2.00 |
| Lead chromate | 1.00 |

Filler (sawdust and rice husks) to make up 100.00.

EXAMPLE 8

| | Percent |
|---|---|
| Silicon carbide | 85.00 |
| Ferrosilicon (15% Si) | 8.00 |
| Lead chromate | 3.00 |
| Potassium dichromate | 1.00 |
| Silica (98% $SiO_2$) | 3.00 |

From the experiments made with the above compositions it is concluded that:

(a) The additions of the exothermic composition of the present invention, containing catalyzed silicon carbide, are always smaller than those made with conventional powders. The decrease ranges from 5% to 50% depending upon the conditions of each specific case.

(b) The periods of the powder action duration with catalyzed SiC are much more controllable, without any risk of there lacking exothermic powder in a certain type of mold.

(c) The exothermic reaction with powders with catalyzed silicon carbide is deeper, i.e., it does not only remain at the metal surface. The reaction utilizing the composition of the present invention attains a depth of 3 to 4 mm., which fact has been proved by an immersion pyrometer and which is explainable by the more penetrating diffusion action of carbon and silicon in elemental form, i.e., in atomic form and, therefore, in the smallest inter-atomic diameters possible and with maximum diffusion of reactivity.

(d) Greater operating facility by the more uniform behaviour possessed by the composition of this invention.

The silicon carbide employed in the above examples had a specific surface area between about 60 m.$^2$/g. and about 300 m.$^2$/g., depending upon the type of crystallization (alpha, beta or gamma), the size grading and the type of the grain surface. Products with specific surface area from 1.5 m.$^2$/g. to colloidal powders with more than 300 m.$^2$/g. may, however, be employed.

The SiC content is determined by the analytical value in SiC of the product employed. One may use products from powder collectors, cleaning of milling systems and screenings, products obtained from the grinding of scraps of grindstones, refractories and the like, provided that the final contents attain the required values to give when duly catalyzed, the referred to specific and controlled reactions.

For the final composition, the ingredients after weighing are placed in the ball mill and are ground until 100% passes through the appropriate screen, e.g., a 150 mesh Tyler screen. Coarser and finer products have been experimented, for instance those passing through a 90 mesh Tyler screen and those passing through a 240 mesh Tyler screen. For the finer side, the variation has no limitations. For the coarser side, products retained on a 4 mesh Tyler screen are not preferred. The ideal size grading found is the one which places the final product between 150 mesh Tyler and 360 mesh Tyler screens, with a total surface of silicon carbide of about 250 m.$^2$/g.

Some of the above-specified compositions still find a specific application in the treatment of cast irons and steels, with a small modification explained below.

The chemical and physical treatment of cast irons and steels, particularly desulfurization, normally constitute several operations which require the application of several ingredients or chemical compositions. This, for instance, a nodular cast iron requires a desulfurization operation prior to the carbon nodulization, with the use of calcium or calcium-silicon carbide it requires a second deoxidation operation and micro-structure treatment (homogenization) in order to, finally, require the application of the nodulizing alloy. By the present invention, utilizing compositions containing silicon carbide and further specified below, these two operatons are carried out simultaneously, thus eliminating one operation, accelerating the overall process and decreasing the operating cost. Another example: certain steels which require deoxidation, desulfurization and exothermic action undergo several treatments either in the furnace or in the pan. With the process for applying such calcium chloride-containing compositions one single operation is carried out, eliminating additional operations, namely, of ferrosilicon, silicon calcium and calcium carbide.

This combination process consists in the desulfurizing, deoxidizing and at the same time heating by exothermic action and by applying to the cast metal from 0.5 to 2.5% of a composition comprising: silicon carbide (between about 60 and about 64%), potassium dichromate (between about 0.5 and about 3%), lead chromate (between about 0.5 and about 3%) and anhydrous calcium chloride (between about 30 and about 39%). The appropriate moment for carrying out this operation is when the metal is poured in the liquid condition from the furnace into the pan, at the jet, in adequate proportions and previously calculated. The size grading of the product to be used by the novel technique ranges from 4 mesh Tyler screen to 325 mesh Tyler screen. In this size grading the best surface is obtained for the chemical reaction of the several ingredients, the required and practically instantaneous stages of which can be thus described:

(a) $2SiC + catalyst + \Delta \rightarrow 2Si + 2C$
(b) $2Si + 2C + 2CaCl_2 \rightarrow CaC_2 + SiCl_4 + Si + Ca$ Elemental Si and C is generated by the decomposition of SiC which is rapid and is catalyzed by the presence of potassium dichromate and lead chromate. Calcium carbide promotes deoxidation and exothermic action while silicon tetrachloride promotes, by its instability at high temperatures, the release of chlorine and silicon. Chlorine shifts sulfur in its combination with iron by desulfurizing these compounds, while free silicon in a stoichiometric excess over the above reactions in the reaction deoxidizes and generates calories by burning. There is further observed the presence of free metallic calcium which functions as an optimum desulfurizer for the case. In the total composition there is an excess of silicon carbide (in coarse crystals) foreseen for the further but practically simultaneous operation for dispersing foliate graphite and for seeding silicon, which is required for the formation of nodulizing nuclei when cast iron is concerned. At this stage, the cast iron is ready to receive the nodulizing alloy, here it is sufficient to apply about 50% of the content generally employed for such a purpose.

In 1010 and 1050 steels, for instance, the desulfurization, deoxidation and homogenization were obtained in a single operation with additions of only 1.5% of the above composition at the jet of the liquid metal.

Unless indicated otherwise, all percentages herein are by weight. Mesh sizes are based on the Tyler standard sieve series.

I claim:
1. An exothermic composition, consisting essentially of: (a) from about 18 to about 90% of particulate silicon carbide; and (b) from about 0.05 to about 15% of a particulate silicon carbide decomposition catalyst selected from the group consisting of lead dioxide, potassium dichromate, lead chromate, and mixtures thereof.
2. The composition of claim 1, wherein the particle size of the silicon carbide and the silicon carbide decomposition catalyst ranges from 150 to 360 mesh.
3. The composition of claim 1, comprising in addition a combustible organic filler, selected from the group consisting of sawdust, plastics, paper, cereal husks, and mixtures thereof.
4. The composition of claim 1, comprising in addition a silicon carbide decomposition retardant selected from the group consisting of silica, alumina and mixtures thereof.
5. The composition of claim 4, said retardant being present in an amount ranging from about 3 to about 15%.
6. The composition of claim 1, wherein the silicon carbide decomposition catalyst comprises from about 0.1 to about 5.5% of lead dioxide.
7. The composition of claim 1, wherein the silicon carbide decomposition catalyst comprises from about 0.05 to about 4.5% of potassium dichromate.
8. The composition of claim 1, wherein the silicon carbide decomposition catalyst comprises from about 0.5 to about 5.0% of lead chromate.
9. The composition of claim 1, wherein the silicon carbide has a specific surface area ranging from about 60 to about 300 square meters per gram.
10. The composition of claim 1, comprising from about 60 to about 64% silicon carbide; from about 0.5 to about 3% potassium dichromate, from about 0.5 to about 3% lead chromate, and from about 30 to about 39% anhydrous calcium chloride.
11. The composition of claim 1, comprising in addition from about 5 to about 10% ferrosilicon, said ferrosilicon containing about 15% silicon.

References Cited
UNITED STATES PATENTS

| | | | |
|---|---|---|---|
| 2,444,424 | 7/1948 | Brown et al. | 75—58 |
| 2,569,146 | 9/1951 | Bolkcom | 75—58 |
| 3,051,564 | 8/1962 | Drenning | 75—58 |
| 3,524,742 | 8/1970 | Williams | 75—58 |
| 3,567,432 | 3/1971 | Wardell | 75—58 |

LEON D. ROSDOL, Primary Examiner

I. GLUCK, Assistant Examiner

U.S. Cl. X.R.

23—208 A; 75—58, 130 R; 106—44; 164—53, 56; 249—106; 252—70